United States Patent
Watté et al.

(10) Patent No.: US 10,739,519 B2
(45) Date of Patent: Aug. 11, 2020

(54) OPTICAL FIBER AND WAVEGUIDE DEVICES HAVING EXPANDED BEAM COUPLING

(71) Applicant: CommScope Connectivity Belgium BVBA, Kessel-Lo (BE)

(72) Inventors: Jan Watté, Grimbergen (BE); Koen Huybrechts, Heverlee (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/745,313

(22) PCT Filed: Jul. 15, 2016

(86) PCT No.: PCT/EP2016/066976
§ 371 (c)(1),
(2) Date: Jan. 16, 2018

(87) PCT Pub. No.: WO2017/009468
PCT Pub. Date: Jan. 19, 2017

(65) Prior Publication Data
US 2018/0217333 A1    Aug. 2, 2018

Related U.S. Application Data

(60) Provisional application No. 62/193,379, filed on Jul. 16, 2015.

(51) Int. Cl.
*G02B 6/30* (2006.01)
*G02B 6/36* (2006.01)
(Continued)

(52) U.S. Cl.
CPC ........... *G02B 6/305* (2013.01); *G02B 6/0288* (2013.01); *G02B 6/1228* (2013.01); *G02B 6/3652* (2013.01); *G02B 6/3885* (2013.01)

(58) Field of Classification Search
CPC ........ G02B 6/10; G02B 6/12; G02B 6/12002; G02B 6/12004; G02B 6/122; G02B 6/26;
(Continued)

(56) References Cited

U.S. PATENT DOCUMENTS 5,444,805 A    8/1995  Mayer
7,283,696 B2   10/2007 Ticknor et al.
(Continued)

FOREIGN PATENT DOCUMENTS

JP    2007-034007 A    2/2007
WO    02/065600 A2     8/2002

OTHER PUBLICATIONS

International Search Report and Written Opinion of the International Searching Authority for corresponding International Patent Application No. PCT/EP2016/066976 dated Sep. 22, 2016, 13 pages.
(Continued)

*Primary Examiner* — Michael P Mooney
(74) *Attorney, Agent, or Firm* — Merchant & Gould P.C.

(57) ABSTRACT

An optical fiber connector includes a coupler (304) having a waveguide section (308) integrally formed with a fiber attachment section (306). At least one waveguide (312) is disposed in the waveguide section and has a core dimension (312a) that is greater at the end of the waveguide at the fiber attachment section. The fiber attachment section (306) has a first surface and at least one recess (310) formed on the first surface for aligning one or more optical fibers (602) with the at least one waveguide (312,612). In an optical fiber component, an optical substrate has a first end and a second end, and at least one waveguide input at the first end and at least one waveguide output at the second end. An integral input portion of the substrate at the first end has one or more input optical fiber alignment elements and an integral output
(Continued)

portion of the substrate at the second end has one or more output optical fiber alignment elements. One or more input optical fibers are positioned in the one or more input optical fiber alignment elements. One or more output optical fibers positioned in the one or more output optical fiber alignment elements.

11 Claims, 11 Drawing Sheets

(51) Int. Cl.
*G02B 6/028* (2006.01)
*G02B 6/122* (2006.01)
*G02B 6/38* (2006.01)

(58) Field of Classification Search
CPC .... G02B 6/028; G02B 6/0288; G02B 6/1228; G02B 6/268; G02B 6/30; G02B 6/43; G02B 6/305; G02B 6/3652
USPC ..... 385/28, 33, 50, 88–92, 129–132, 37, 43, 385/49, 52, 124
See application file for complete search history.

(56) References Cited

U.S. PATENT DOCUMENTS

| | | | |
|---|---|---|---|
| 9,223,095 | B2 | 12/2015 | Hodge |
| 9,405,076 | B2 | 8/2016 | Chen et al. |
| 9,405,079 | B2 | 8/2016 | Hodge |
| 9,541,708 | B2 | 1/2017 | Hodge |
| 9,563,026 | B2 | 2/2017 | Hodge |
| 9,625,654 | B2 | 4/2017 | Hodge et al. |
| 9,759,870 | B2 | 9/2017 | Chen et al. |
| 9,977,194 | B2 | 5/2018 | Waldron et al. |
| 2003/0072550 | A1* | 4/2003 | Sasaura .............. G02F 1/3551 385/132 |
| 2006/0245694 | A1 | 11/2006 | Chen et al. |
| 2007/0223552 | A1* | 9/2007 | Muendel ........... G02B 6/12004 372/50.12 |
| 2009/0154884 | A1 | 6/2009 | Chen et al. |
| 2010/0310214 | A1* | 12/2010 | Miyadera ............... G02B 6/30 385/91 |
| 2014/0185990 | A1 | 7/2014 | Hodge et al. |
| 2014/0286609 | A1 | 9/2014 | Hodge et al. |
| 2014/0294395 | A1 | 10/2014 | Waldron et al. |
| 2014/0321814 | A1 | 10/2014 | Chen et al. |
| 2014/0341510 | A1 | 11/2014 | Hodge |
| 2016/0054526 | A1 | 2/2016 | Hodge |
| 2016/0124158 | A1 | 5/2016 | Hodge |
| 2016/0341905 | A1 | 11/2016 | Chen et al. |
| 2016/0341908 | A1 | 11/2016 | Hodge |

OTHER PUBLICATIONS

Diez-Blanco, V. et al., "Femtosecond laser writing of optical waveguides with controllable core size in high refractive index glass", Appl. Phys. A., 88: 239-242 (2007).
Ehrt, D. et al., "Femtosecond-laser-writing in various glasses", Journal of Non-Crystalline Solids, 345-345: 332-337 (2004).
Ho, S. et al., "Single and Multi-Scan Femtosecond Laser Writing for Selective Chemical Etching of Glass Micro-Channels", Optical Society of America, 2 pages (2007).
Ponader, C. et al., "Origin of the refractive-index increase in laser-written waveguides in glasses", Journal of Applied Physics, 103: 063516-1-06351-5 (2008).
Streltsov, A. et al., "Laser-written high-contrast waveguides in glass", Proc. of SPIE, 7366: 736611-1-736611-8 (2009).
Xu, L. et al., "Lateral gradient index microlenses written in ophthalmic hydrogel polymers by femtosecond laser micromachining", Optical Materials Express, 1(8): 1416-1424 (2011).
Huang, H. et al., "Femtosecond fiber laser direct writing of optical waveguide in glasses", Proc. SPIE 8164, Nanophotonics and Macrophotonics for Space Environments V, 1-8 (2011).
Nazarathy, M. et al., "Performance evaluation of software defined transmitter and receiver", Adaptive Software Defined Terabit Transceiver for Flexible Optical Networks, ASTRON, 39 pgs (2016).
Papastergiou, G., "Public executive summary of the first Project Periodic Report D1.7", Adaptive Software Defined Terabit Transceiver for Flexible Optical, ASTRON, 1-7 (2014).
Papastergiou, G., "Public executive summary of the final Project Periodic Report D1.9", Adaptive Software Defined Terabit Transceiver for Flexible Optical Networks, ASTRON, 1-34 (2016).
Papastergiou, G., "Overview Presentation of the Overall Progress of the ASTRON Project", Adaptive Software Defined Terabit Transceiver for Flexible Optical Networks, ASTRON, 1-10 (2016).
Rivas-Moscoso, J. et al., "Techno-economic analysis with respect to green aspects and cost D2.7", Adaptive Software Defined Terabit Transceiver for Flexible Optical Networks, ASTRON, 1-90 (2015).
Tomkos, I., Overview of Overall Progress and Issues, ASTRON Final Review Meeting, Adaptive Software Defined Terabit Transceiver for Flexible Optical Networks, ASTRON, 1-56 (2016).
Zakynthinos, P. et al., "The EU Research Project ASTRON: Advanced Hybrid Integrated Devices to Realize Flexible Terabit Networking", Adaptive Software Defined Terabit Transceiver for Flexible Optical Networks, ASTRON, 1-13 (2013).
Papastergiou, G., "Public executive summary of the interim progress report D1.5", Adaptive Software Defined Terabit Transceiver for Flexible Optical Networks, ASTRON, 1-8 (2013).

* cited by examiner

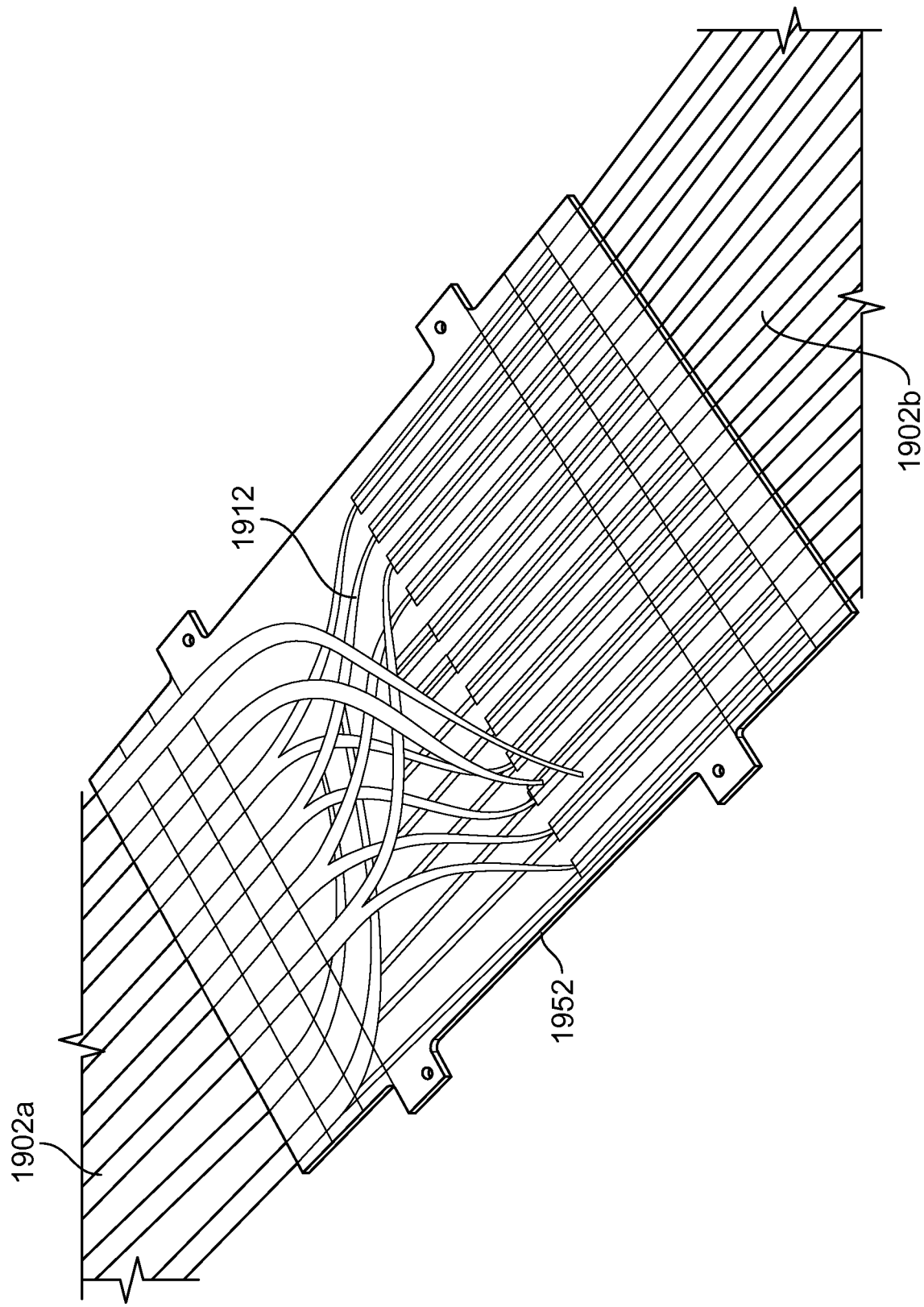

OPTICAL FIBER AND WAVEGUIDE DEVICES HAVING EXPANDED BEAM COUPLING

CROSS-REFERENCE TO RELATED APPLICATION

This application is a National Stage Application of PCT/EP2016/066976, filed on Jul. 15, 2016, which claims the benefit of U.S. Patent Application Ser. No. 62/193,379, filed on Jul. 16, 2015 the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

Fiber optic networks use passive fiber optic lines, typically connecting a central office to a number of end subscribers (also referred to herein as end user). The central office can additionally connect to a larger network such as the Internet and/or to a public switched telephone network. The network can also include fiber distribution hubs (FDHs) that use one or more optical splitters (e.g., 1-to-8 splitters, 1-to-16 splitters, or 1-to-32 splitters) that generate a number of individual fibers that may lead to the premises of an end user.

Prior solutions for connecting multiple optical fibers are typified by the MT-based family of ferrules and associated latching mechanisms such as the MPO and MTP connectors. The MT ferrule is a high precision part fabricated by transfer or injection molding. Each optical fiber has to be positioned into a dedicated molded hole of the MT ferrule. The position and diameter of the fiber locating holes are held to a tight tolerance, for example less than around 3 µm. The fibers are fixed with adhesive after being loaded into the molded holes of the ferrule. The face of the connector is then precisely polished. The connector is then overmolded with a cover. Each cover is configured with complementary snap-fit elements to permit two covers to be coupled together to make a connection between two bundles of optical fibers. For example, the ferrules may have one or more rows of twelve fibers.

Many of these assembly processes are primarily manual, and therefore expensive and challenging to ramp into very high volume production. They require high precision molding, which increases the component cost. Additionally, they are susceptible to losses caused by particles of dust or dirt that may be present on the end surfaces of the fibers.

SUMMARY

According to some embodiments of the invention, an optical fiber connector includes a coupler having a waveguide section integrally formed with a fiber attachment section. The waveguide section has a first end proximate the fiber attachment section and a second end distal from the fiber attachment section. At least a first waveguide is disposed in the waveguide section to lead light between the first end of the waveguide section and the second end of the waveguide section. The at least a first waveguide has a first core cross-section at the first end of the waveguide section and a second core cross-section at the second end of the waveguide section. The second core cross-section has an area larger than an area of the first core cross-section. The input section has a first surface and at least one recess formed on the first surface for aligning an optical fiber with a respective waveguide of the waveguide section.

According to other embodiments of the invention, a method of manufacturing an optical coupler includes forming at least a first waveguide in a substrate, where the substrate has a first end portion and a second end portion. The at least a first waveguide has a first core cross-section proximate the first end portion and a second core cross-section at the second end portion. An area of the first core cross-section is less than an area of the second core cross-section. The method also includes forming integrally on the substrate at least a first optical fiber aligning feature at the first end portion. The at least one optical fiber aligning feature is capable of aligning at least a first optical fiber core of at least a first optical fiber with a respective at least a first waveguide.

Other embodiments of the invention are directed to an optical fiber component that includes an optical substrate having a first end and a second end. The optical substrate has at least one waveguide input at the first end and at least one waveguide output at the second end. An integral input portion of the substrate at the first end has one or more input optical fiber alignment elements and an integral output portion of the substrate at the second end has one or more output optical fiber alignment elements. One or more input optical fibers are positioned in the one or more input optical fiber alignment elements. One or more output optical fibers positioned in the one or more output optical fiber alignment elements.

Other embodiments of the invention are directed to a method of manufacturing an optical device. The method includes forming at least a first waveguide in a substrate. The substrate has a first end and a second end. The substrate comprises at least one waveguide input at the first end and at least one waveguide output at the second end. The method also includes forming integrally at the first end of the substrate at least one input optical fiber aligning feature. The at least one optical fiber aligning feature is capable of aligning at least one input optical fiber core of at least one input optical fiber with a respective at least one waveguide input. The method also includes forming integrally at the second end of the substrate at least one output optical fiber aligning feature. The at least one output optical fiber aligning feature is capable of aligning at least a first output optical fiber core of at least one output optical fiber with a respective at least one waveguide output.

BRIEF DESCRIPTION OF THE DRAWINGS

FIGS. 19A and 19B schematically illustrate a fiber-coupled substrate device incorporated in a flex-fiber configuration according to an embodiment of the present invention.

DETAILED DESCRIPTION

Figure 1:
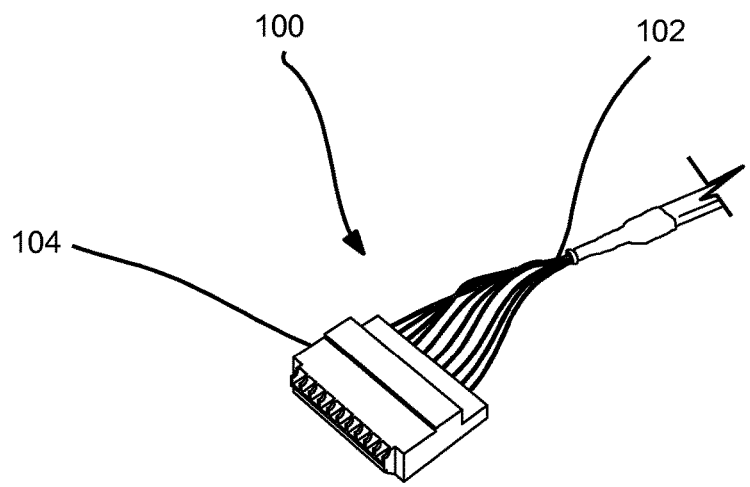
FIG. 1 schematically illustrates a waveguide coupler attached to a bundle of optical fibers, according to an embodiment of the invention.

Part of a fiber optic connector 100 according to one embodiment of the invention is illustrated in FIG. 1. One or more optical fibers 102 are connected to a waveguide coupler 104. The fibers 102 may be part of a fiber bundle, a fiber ribbon or may be arranged together in some other way. The waveguide coupler 104 is preferably made of glass, polymer or some other material that is optically transparent to light that propagates along the fibers 102 and is capable of incorporating waveguides formed within the coupler 104, as is discussed below.

Figure 2:
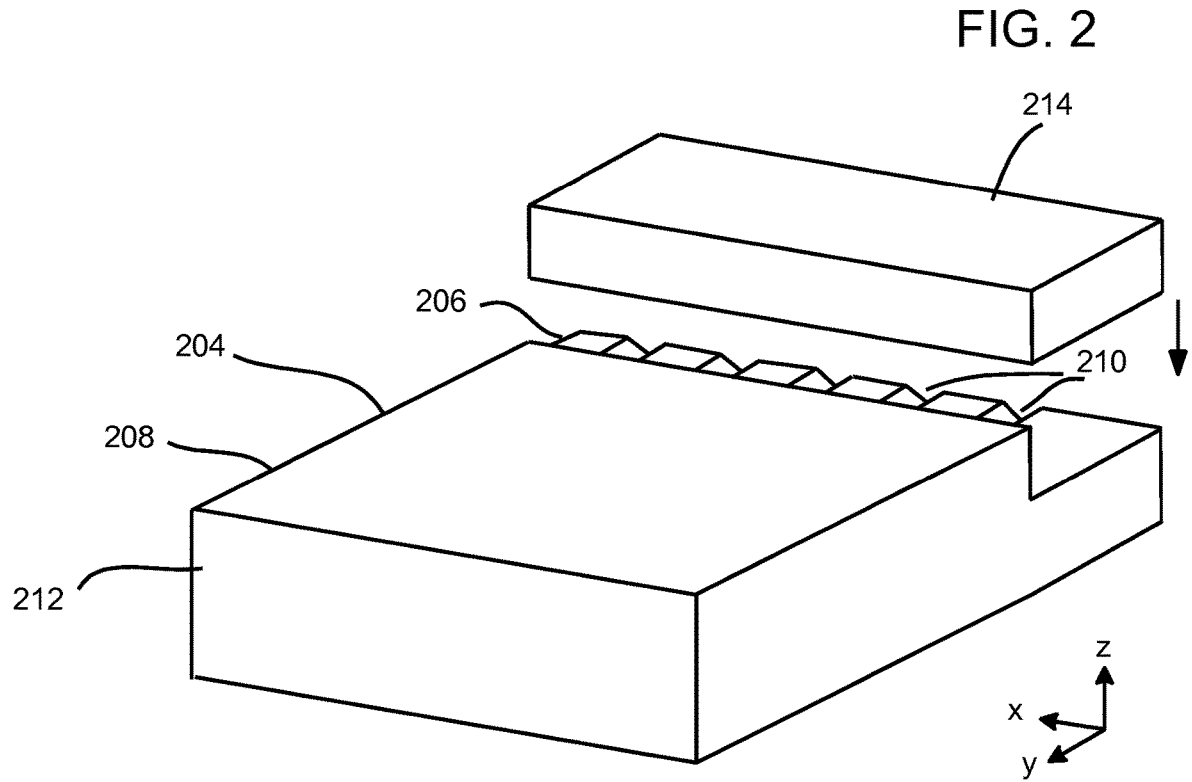
FIG. 2 schematically illustrates a waveguide coupler according to an embodiment of the present invention.

An embodiment of the waveguide coupler 204 is illustrated in FIG. 2. The coupler 204 has a fiber attachment section 206 at one end where optical fibers are attached to the coupler 204 and has a waveguide section 208 integrally formed with the fiber attachment section 206. For example, the fiber attachment section 206 and the waveguide section 208 are formed from a single piece of optical material. The fiber attachment section 206 is provided with one or more fiber alignment recesses 210 for receiving respective fibers and aligning the cores of the fibers with respective waveguides in the waveguide section 206. The waveguide section 208 is terminated at an output coupling face 212. An attachment section cover 214 may be attached over the attachment section 206 once fibers are aligned and fixed in place on the attachment section 206. The fibers may be fixed in place using any suitable technique, for example via the use of an adhesive such as a UV-cured adhesive. The attachment section cover 214 may also be attached via an adhesive such as a UV-cured adhesive. In other embodiments, the cover section may be configured to apply pressure to the fibers so as to maintain their positions in the alignment recesses 210.

In the illustrated embodiment the waveguide coupler 204 is provided with five fiber alignment recesses 210, but it will be appreciated that the waveguide coupler 204 may be provided with any desired number of fiber alignment recesses 210 to accommodate the number of optical fibers being connected to the coupler 204. For example, there may be 10, 20 or some other number of fibers being connected to the waveguide coupler 204, and each fiber will be attached and aligned to the waveguide coupler via its own alignment recess 210. Other arrangements may include 12 fibers, or multiples of 12 useful in MPO and MTP connectors.

Figure 3:
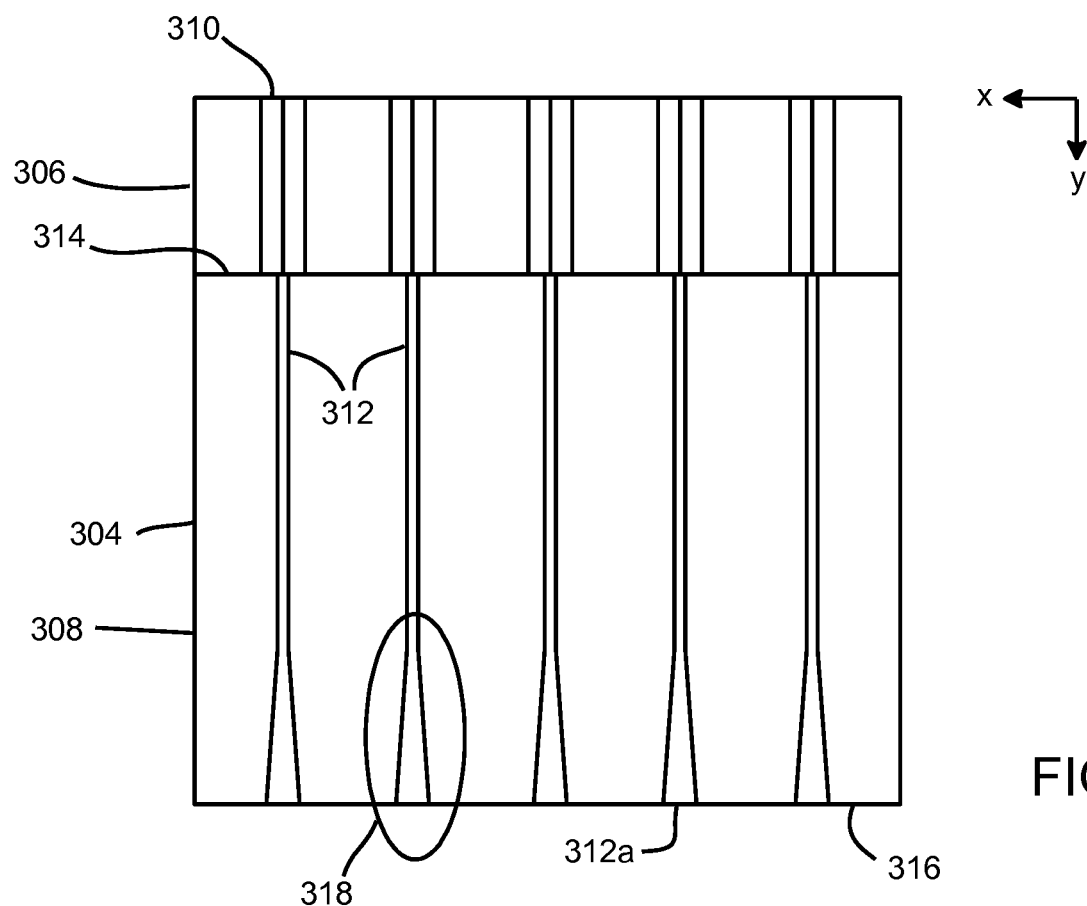
FIG. 3 schematically illustrates a top view of a waveguide coupler according to an embodiment of the present invention.

A plan view of an illustrated embodiment of the waveguide coupler 304 is presented in FIG. 3, showing a fiber attachment section 306 and a waveguide section 308. The waveguide section 308 includes a number of waveguides 312 positioned relative to the fiber alignment recesses 310 so that light passes from an aligned fiber in the fiber alignment recess 310 into a respective waveguide 312 in the waveguide section 304. The waveguides 312 lie between the first end 314 of the waveguide section 308 and the second end 316 of the waveguide section 308. Light propagating along the waveguide 312 from the first end 314 to the second end 316 is confined to the waveguide because the waveguide 302 has a higher refractive index than that of the surrounding material of the waveguide section 308. In the illustrated embodiment, the core of the waveguide 312 has a cross-sectional dimension at the first end 314 denoted as D1. Where the waveguide 312 has a circular cross-sectional core, D1 represents a core diameter, although the waveguide 312 may also have other cross-sectional shapes, such as elliptical or rectangular. At the second end 316 the waveguide 312 has a cross-sectional dimension of D2, where D2 is greater than D1. Thus, the cross-sectional dimension of the waveguide 312 is greater at the second end 316 than the first end 314, and is also larger than cores of the fibers attached to the coupler 204. The larger waveguide cores 312a at the second end 316 reduce the alignment accuracy required to couple light between couplers than is currently required for MT-type couplers, which require high accuracy for aligning the core of a first fiber to the core of a second fiber in order to couple light from the first fiber to the second fiber. Thus, the coupler of the present invention is easier to align than conventional couplers, and is therefore less expensive to assemble. In addition, any losses arising from the presence of dust between the two halves of a coupler are reduced due to the larger size of optical beam.

In the illustrated embodiment, waveguide 312 is provided with a tapered region 318 that includes a linear taper to expand the dimension of the waveguide core. Tapers having other profiles may also be used, for example a taper having a core that expands logarithmically or as a series of steps.

Figure 4:
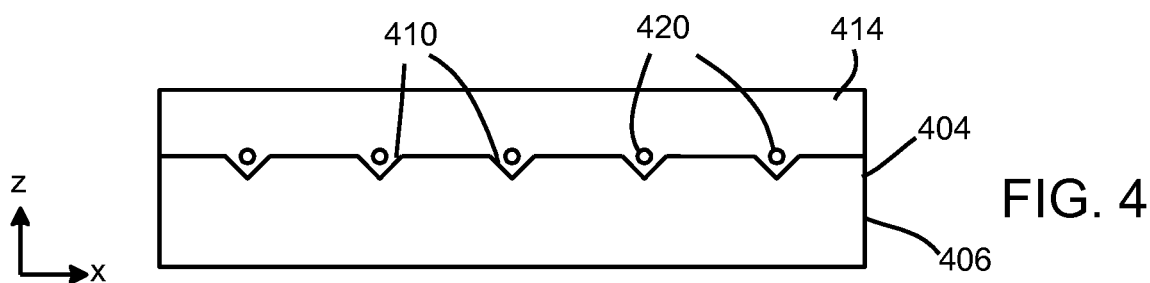
FIG. 4 schematically illustrates an input end view of a waveguide coupler according to an embodiment of the present invention.

A view of an input side of a coupler 404 is schematically illustrated in FIG. 4, showing a set of fiber alignment features 410 and a set of associated waveguide inputs 420 at the first end 414 of the waveguide section 404 that optically couple to fibers aligned in the fiber alignment features 410.

Figure 5:
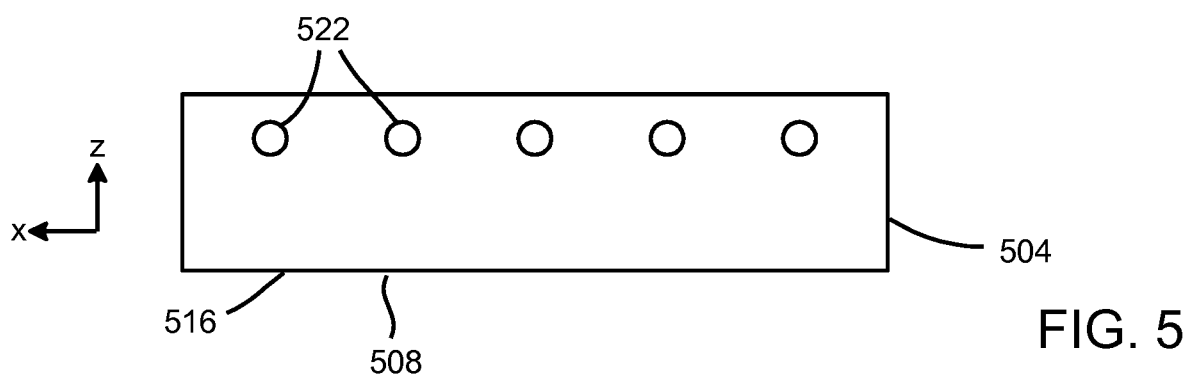
FIG. 5 schematically illustrates an output end view of a waveguide coupler according to an embodiment of the present invention.

A view of the second end 516 of the waveguide section 508 is schematically illustrated in FIG. 5, showing the expanded waveguide outputs 522 at the second end 516. In some embodiments the second end 516 may be provided with an antireflection coating to reduce reflective losses of light passing out of the coupler 504. In this embodiment, the waveguides 312 are parallel and define a single plane. It will be appreciated, however, that the waveguides 312 need not all lie in a single plane.

Figure 6:
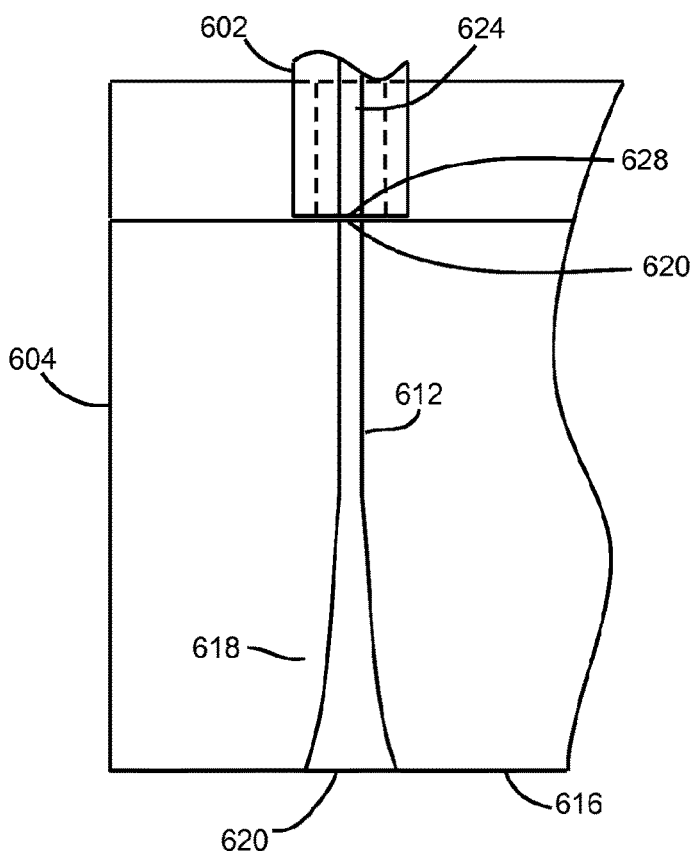
FIG. 6 schematically illustrates a top view of waveguide coupler according to another embodiment of the present invention.

Another embodiment of a waveguide 612 having a core cross-sectional dimension larger at the second end 616 of the coupler 604 is schematically illustrated in FIG. 6. The figure shows a fiber 602 having a fiber core 624 that is aligned to the waveguide input 620 resting in a fiber alignment recess 610 (dashed lines). It will be appreciated that although only one waveguide 612 is shown, the coupler 604 may be provided with another number of waveguides. In this embodiment, the waveguide 612 includes tapered region 618 having a nonlinear taper that leads to waveguide output 622. In some embodiments the tapered region 618 may have a taper profile that reduces or minimizes optical energy losses.

To reduce the effects of reflective losses at the output of the fiber core 624 and the waveguide input 620, the fiber core output 628 and/or the waveguide input 620 may be provided with antireflective coatings. In other embodiments, an index-matching fluid may be provided between the fiber 602 and the waveguide input 620 to reduce reflective effects.

Figure 7:
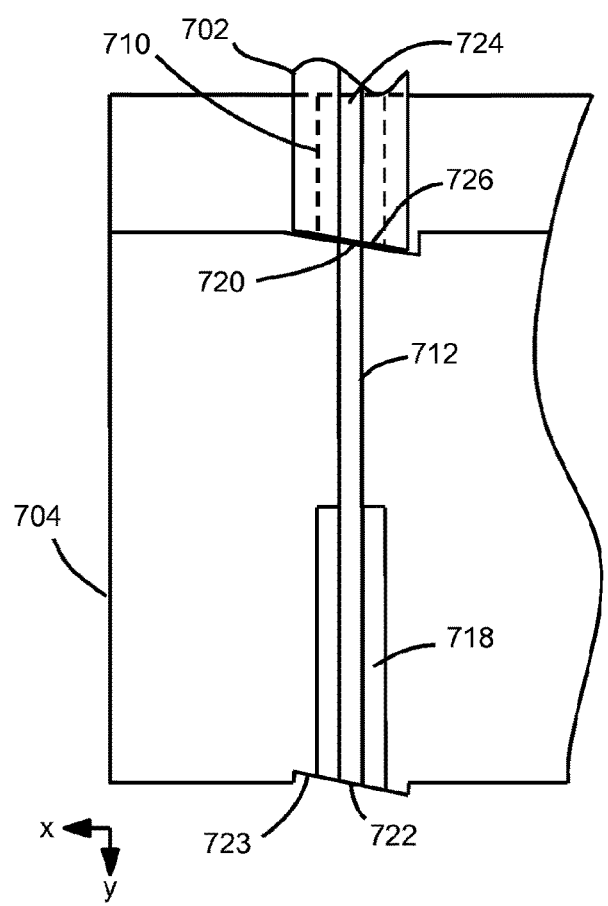
FIG. 7 schematically illustrates a top view of a waveguide coupler according to another embodiment of the present invention.

Another embodiment of coupler 704 is schematically illustrated in FIG. 7. The figure shows a fiber 702 having a fiber core 724 resting in a fiber alignment recess 710 (dashed lines), so that it is aligned to the waveguide input 720. It will be appreciated that although only one waveguide 712 is shown, the coupler 704 may be provided with another number of waveguides. In this embodiment, the waveguide 712 includes a graded index (GRIN) section 718 proximate the waveguide output 722. The GRIN section 718 permits light to exit the waveguide output 722 with a larger beam diameter than light exiting the fiber core 724. Furthermore, the GRIN section 718 may be tailored to collimate light exiting the waveguide output 722.

Also illustrated in FIG. 7 is another approach to coupling light from a fiber 702 into the coupler 704 that reduces the effects of reflected light. The waveguide input 720 and the fiber core output 726 are both angled to be non-perpendicular to the propagation axis of the light along the waveguide 712 (in the direction of the y-axis). In this embodiment light reflected from either the waveguide input 720 or the fiber output 726 is directed off the propagation path of the light signal.

In some embodiments, the waveguide output 722 may be provided with an angled face 723 that is non-perpendicular to the propagation direction of light along the waveguide 712 so that light reflected at the waveguide output 722 is directed off the propagation path of the light signal. It will be appreciated that the coupler 704 may be provided with either or both of the waveguide input 720 and waveguide output 722 angled, or neither may be angled.

Figure 8:
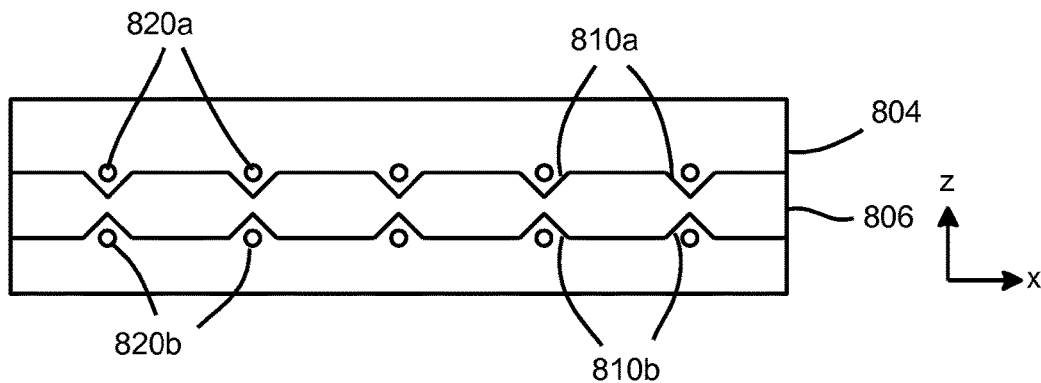
FIG. 8 schematically illustrates an input end view of a waveguide coupler having two rows of fibers as input, according to another embodiment of the invention.
Figure 9:
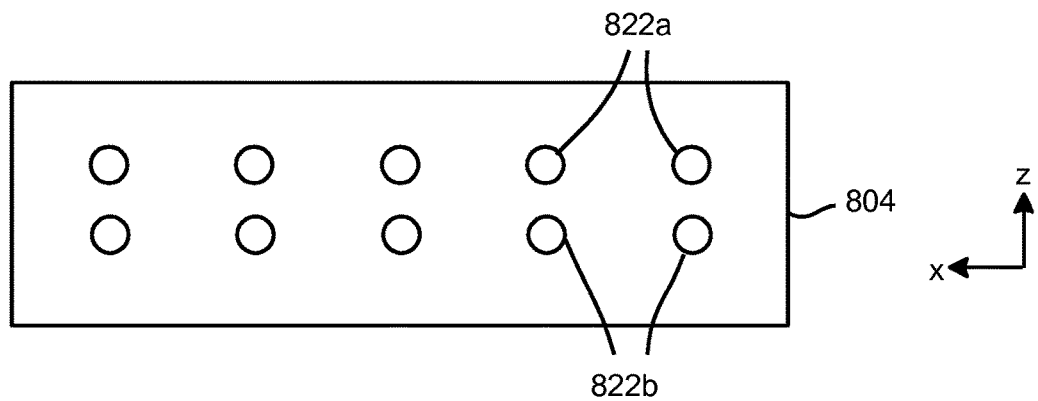
FIG. 9 schematically illustrates an output end view of a waveguide coupler having two rows of fibers as input, according to an embodiment of the invention.
Figure 10:
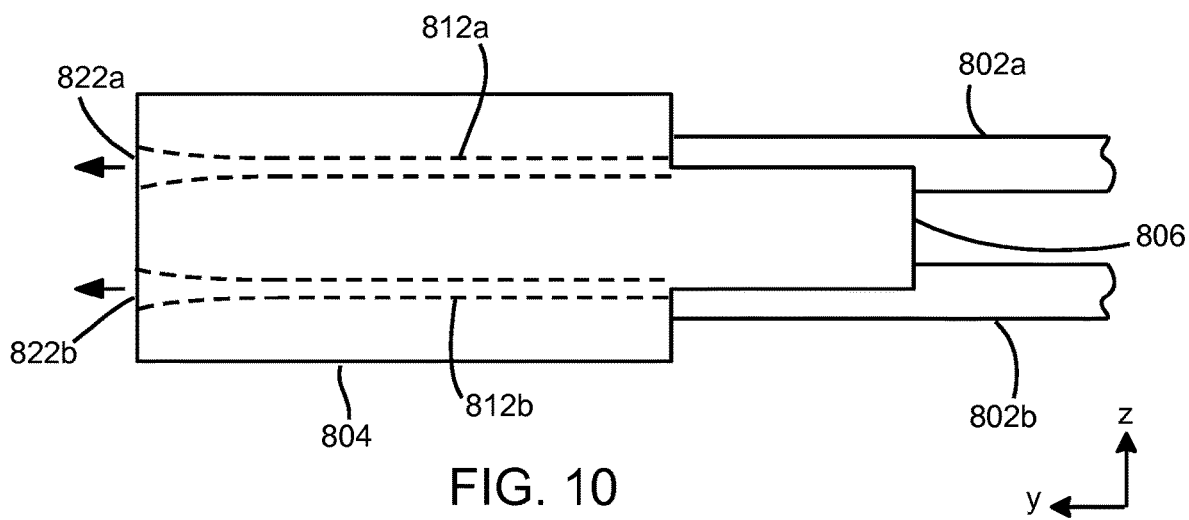
FIG. 10 schematically illustrates a side view of a waveguide coupler having two rows of fibers as input, according to an embodiment of the invention.

Another embodiment of coupler 804 is schematically illustrated in FIGS. 8-10. In FIG. 8, coupler 804 is provided with a first set of waveguide inputs 820a and a second set of waveguide inputs 820b that are not coplanar with the first set of waveguide inputs 822a. Fiber alignment recesses 810a and 810b are provided on the upper and lower side respectively of the fiber alignment section 806. The second end 816 of the coupler 804 has two sets of waveguide outputs 822a and 822b that correspond to the waveguide inputs 820a and 820b respectively. The waveguide outputs 822a and 822b are expanded with respect to the inputs 820a and 820b.

FIG. 10 schematically illustrates a side view of a coupler 804 with fibers 802a and 802b aligned on the fiber attachment section 806 in respective fiber alignment recesses 810a and 810b. The fibers 802a and 802b may be fixed in place using, for example, a UV-cured adhesive. Also illustrated are waveguides 812a and 812b for guiding light from respective fibers 802a and 802b to the waveguide outputs 822a and 822b at the second end 816 of the coupler 804. In this embodiment, the first set of waveguides 812a define a first plane while the second set of waveguides 812b define a second plane that is displaced from the first plane.

Figure 11:
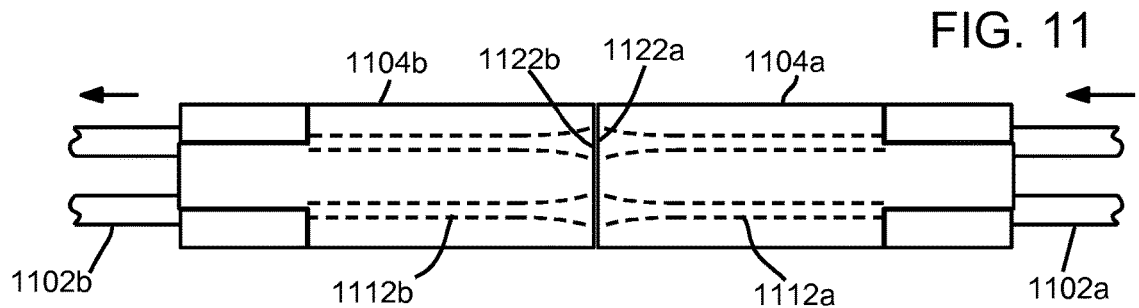
FIG. 11 schematically illustrate a side view of two waveguide couplers used for coupling light from one set of optical fibers to another set of optical fibers, according to an embodiment of the present invention.

FIG. 11 schematically illustrates how two couplers 1104a and 1104b may be used to couple light from a first set of fibers 1102a to a second set of fibers 1002b. Light from the first set of fibers 1102a passes into the waveguides 1112a in the first coupler 1104a and pass out of the expanded waveguide outputs 1122a in a direction towards the second coupler 1104b.

It will be appreciated that, although the terms "input" and "output" can connote a direction of light propagation, the use of such terms herein is not intended to restrict the invention to having light travel in only one particular direction, and light may travel in different directions through a device. Therefore, if light passes in one direction through a coupler, the light may pass into the device through an input and out of the device through an output. However, if the direction of light is reversed through the same device, the light may pass into the device through what was previously considered to be the output and out of the device through what was considered to be the input. Thus, the use of the terms "input" and "output" do not restrict the direction in which light can pass through a device.

Thus, in this embodiment the second coupler 1104a includes tapered waveguide 1112b with expanded ports 1122b through which light enters from the first coupler 1104a. The light passes along the waveguides 1112b in the direction such that the cores of the waveguides 1112b reduce in size to match the cores of the second set of fibers 1102b aligned to receive light from the waveguide 1112b.

Figure 12:
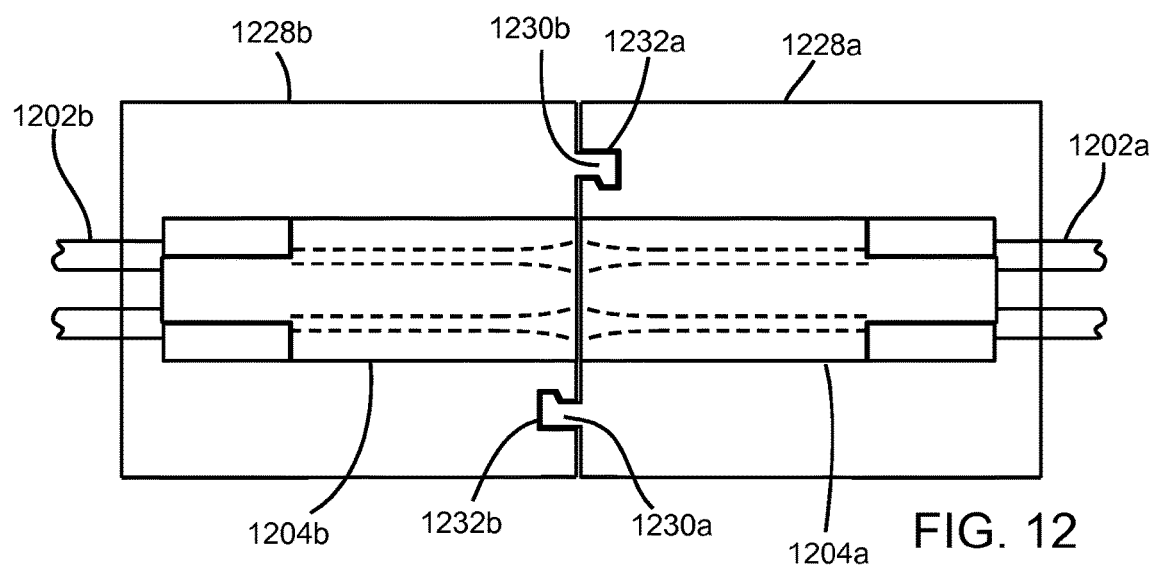
FIG. 12 schematically illustrates a side view of two waveguide couplers with interlocking covers according to an embodiment of the present invention.
Figure 13:
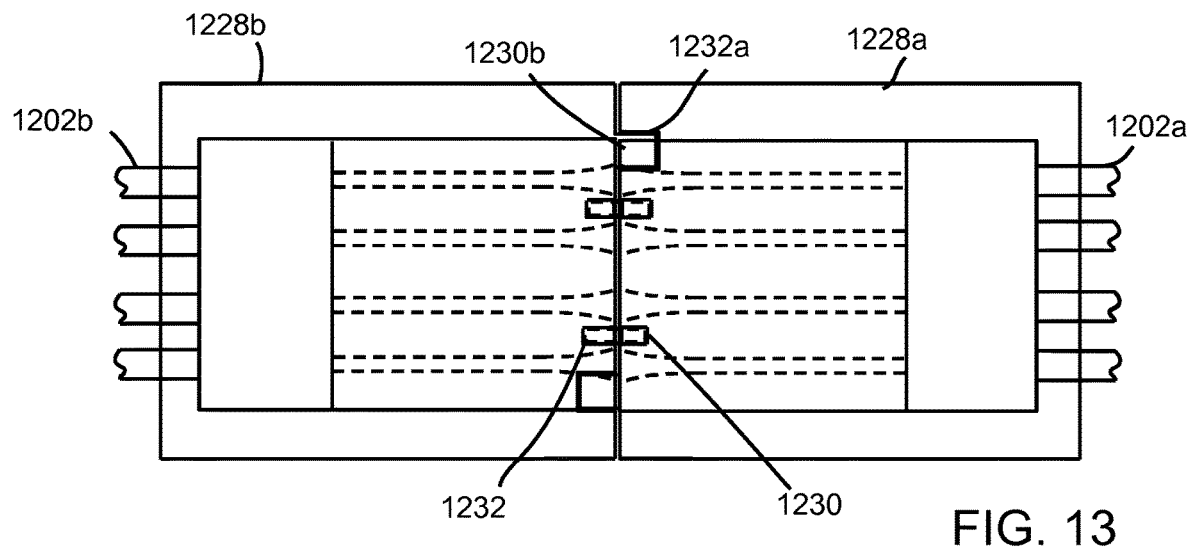
FIG. 13 schematically illustrates a top view of two waveguide couplers with interlocking covers according to an embodiment of the present invention.

The couplers 1104 and 1104b may be provided with covers, for example formed of plastic or some other type of material that can be molded. For example, the cover may be formed on the coupler via overmolding. One embodiment of such a cover is schematically illustrated in FIGS. 12 and 13, which show two couplers 1204a and 1204b for transmitting light between two sets of fibers 1202a and 1202b. Each coupler 1204a and 1204b is provided with a respective cover 1228a and 1228b. The covers 1228a and 1228b may be provided with mutual attachment mechanisms so that the covers 1228a and 1228b are held together in alignment. For example, in the illustrated embodiment attachment protrusions 1230a and 1230b fit into respective attachment receiving slots 1232b and 1232a to latch the two covers 1228a and 1228b together. It will be appreciated that other approaches to maintaining the relative positions of the covers 1228a and 1228b may be employed, for example via the use of clips, sleeves and the like.

In addition, the covers 1228*a* and 1228*b*, and/or the couplers 1204*a* and 1204*b* may be provided mechanisms to ensure the relative alignment of the couplers 1204*a* and 1204*b*. In the illustrated embodiment, each coupler 1204*a* and 1204*b* is provided with a locating pin recess 1230 and a locating pin that sits within the recess 1230 of each coupler 1204*a* and 1204*b* to align the couplers 1204*a* and 1204*b*.

Waveguides may be made in the coupler using any suitable process including, for example, femtosecond layer 3-D writing and ion implantation. Unlike planar technologies like diffusion and lithographic methods, direct writing of 3-D optical structures has been developed using ultra-short-pulse lasers, for example having pulse lengths in the sub-picosecond regime. Such lasers are generally referred to as femtosecond lasers pulse in the lasers. It is understood that nonlinear absorption at the focal volume results in local densification of the material which results in a local refractive index increase. The region of material thus treated is limited in volume due to the nonlinear mature of the interaction and by optical control of the lateral dimensions of the beam. Furthermore, the power level of the writing laser can be set such that the longitudinal limits (along the direction of the propagation of the writing beam) of the treated volume are small, close to the focus of the writing beam. Thus, 3-D optical structures can be written in substrates by writing one volume element (voxel) at a time. The amount by which the refractive index can be changed is dependent on the intensity of the light at the writing focus, as well as the speed at which the writing laser beam is translated within the substrate. Larger or smaller refractive index changes result from moving the writing laser focus within the substrate more slowly or more quickly. Since the light intensity is proportional to the pulse energy and inversely proportional to the focal area and the pulse length, changing any of these parameters can result in a concomitant change in the refractive index difference written in the substrate. Thus, various parameters of the writing laser beam can be controlled to create an optical structure in the substrate having a desired shape and refractive index difference relative to the surrounding, unwritten, substrate material. Femtosecond laser 3-D writing has recently been developed as a technique for manufacturing waveguide structures in glass and polymer substrates, and can be used to provide waveguides of a desired shape and voxels in the substrate material of a controlled refractive index difference. Furthermore, the refractive index difference of the written volume may contain spatial variations. A GRIN waveguide structure can be written, for example, with a relatively high refractive index close to the waveguide axis and the refractive index falling radially away from the waveguide axis.

In addition, the fiber alignment recesses may be formed in the coupler, in addition to the waveguides, using a 3-D laser processing approach, thus ensuring alignment of the fiber alignment features with the waveguides written in the coupler. For example, femtosecond laser treatment of glass is known to result in selective chemical etching. Thus, one possible method of fabricating the fiber alignment features is to process the substrate used for the coupler with femtosecond laser light prior to etching, and then etching the fiber alignment features. Such a method is exemplified in FIGS. 14A-E.

Figure 14A:
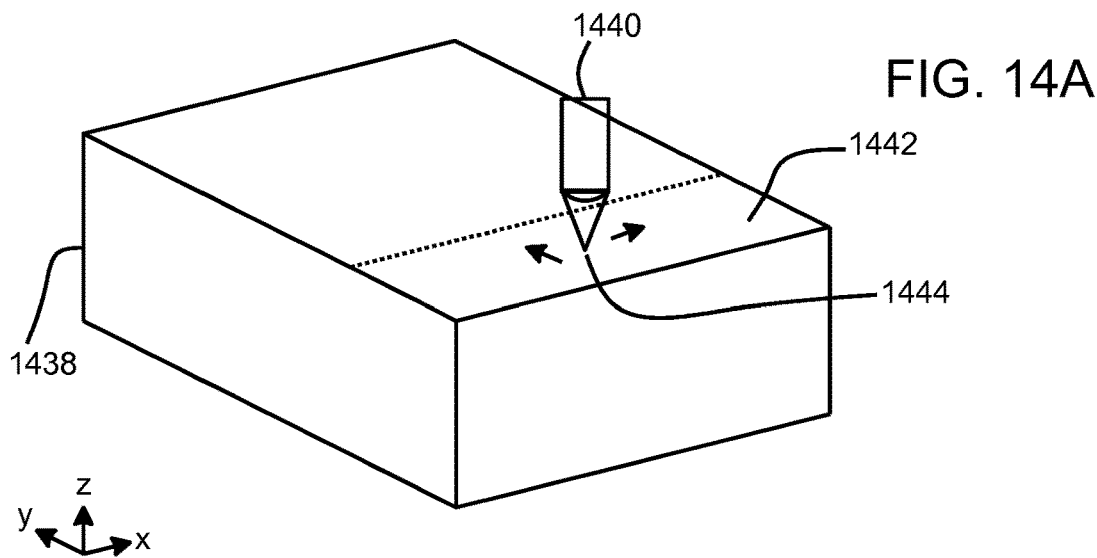
FIGS. 14A-14E schematically illustrate different stages in the fabrication of a device according to an embodiment of the present invention.
Figure 14B:
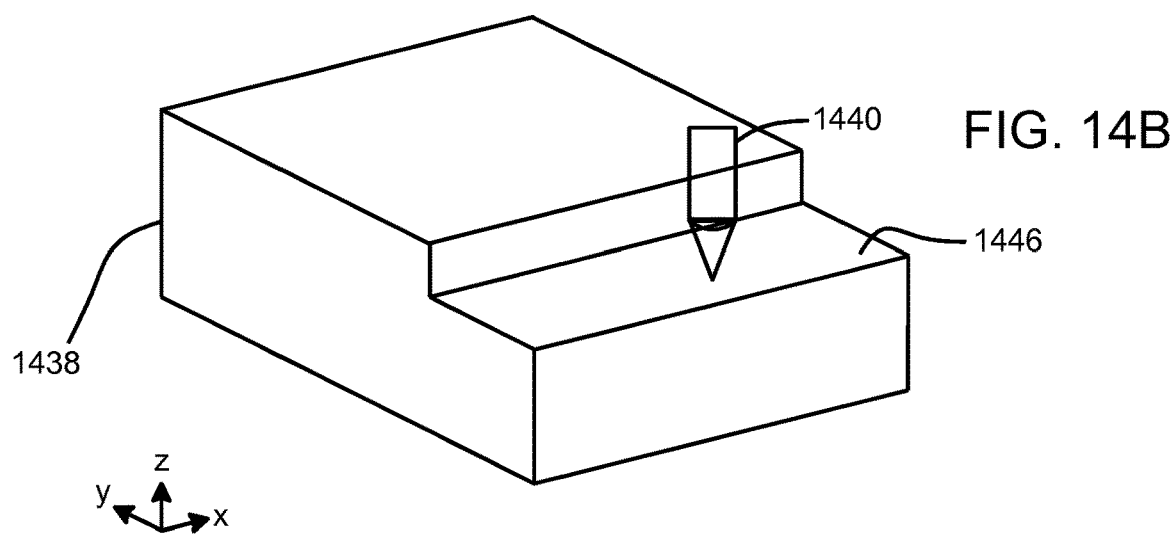
Figure 14C:
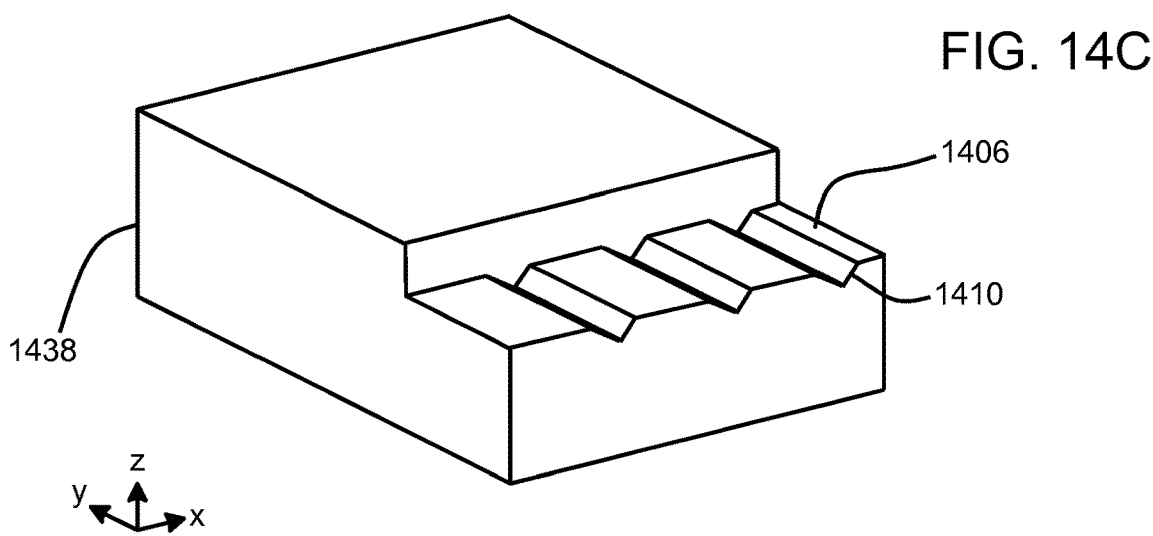

FIG. 14A shows a transparent substrate 1438 in which a waveguide structure is to be written. A femtosecond writing laser 1440 illuminates a portion 1442 of the substrate 1438 where the fiber alignment section is going to be fabricated. The relative positions of the laser focus 1444 and the substrate 1438 are changed, for example the substrate 1438 is mounted to an x-y-z stage to allow translation in the three dimensions. After laser treatment of the portion 1442, the portion 1442 can be etched to produce a ledge 1446, seen in FIG. 14B. The writing laser 1440 can then treat the remainder of the substrate 1438 with a V-groove pattern which is then etched to produce the substrate 1438 having a fiber attachment section 1406 provided with fiber alignment recesses 1410.

Figure 14D:
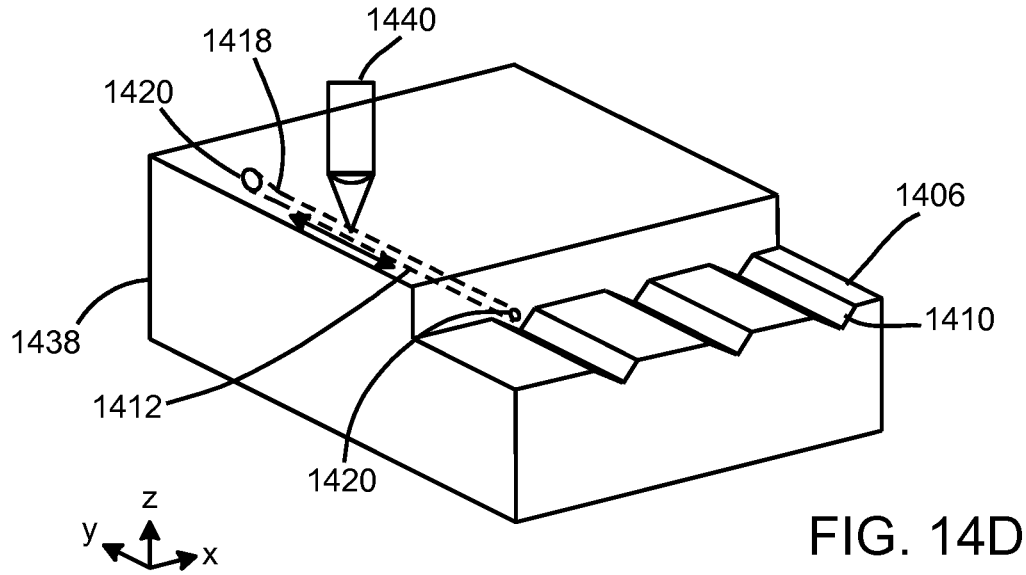
Figure 14E:
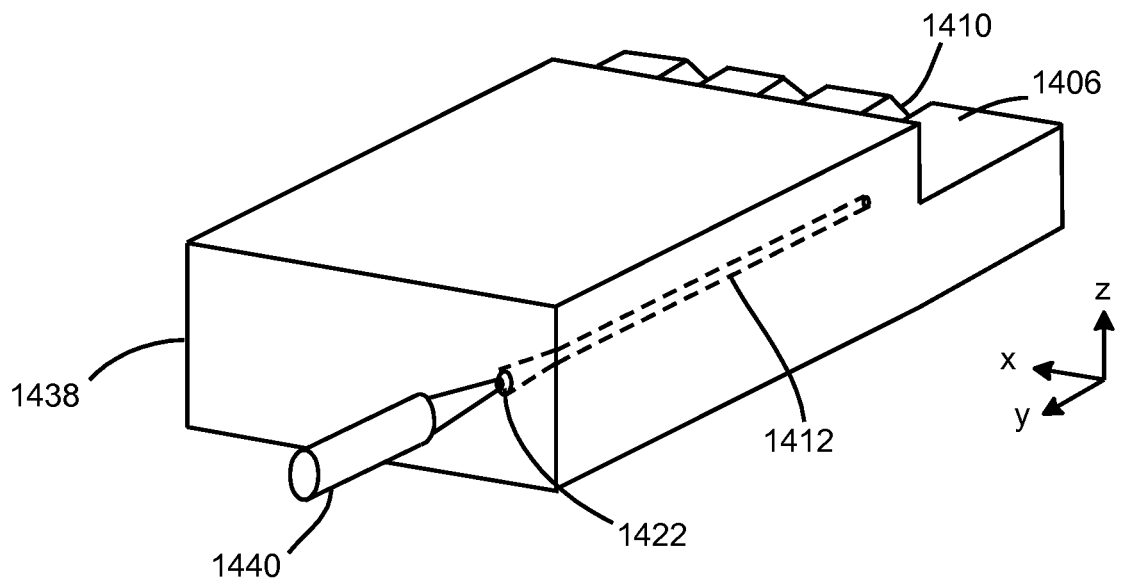

The laser 1440 is used to form the waveguides 1412 by 3-D writing within the substrate 1438, as shown in FIG. 14D, where the laser focus 1444 is moved laterally, in a direction perpendicular to the direction of the writing laser beam, to form the waveguide 1412. The laser 1440 can be used to write the entire waveguide 1412 from the waveguide input 1420 to the waveguide output 1422, including the expanded core section 1418, whether the expanded core section includes a taper in the waveguide 1412, or a GRIN section. Alternatively, the laser 1440 may write the waveguide 1412 in a longitudinal manner, where the laser focus 1444 is translated in a direction along the direction of the writing laser light, to form the waveguide 1412.

Accurate control of the translation stages that move the substrate 1438 relative to the laser focus 1444 can ensure that the waveguide inputs 1420 are positioned correctly relative to the fiber alignment recesses 1410 so that the waveguide inputs 1420 optically couple to the cores of the fibers that are attached in the fiber attachment section 1406.

Figure 15:
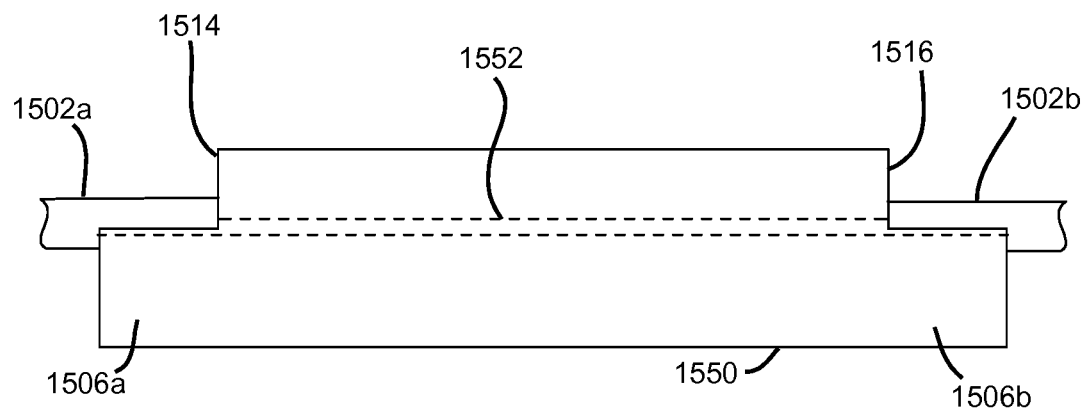
FIG. 15 schematically illustrates a waveguide device according to an embodiment of the present invention having optical fibers coupled to two ends of the device.

Another embodiment of a fiber-coupled device according to the present invention is shown schematically in FIG. 15. The device 1500 includes a substrate 1550 with fiber attachment portions 1506*a* and 1506*b* at each end. Thus one or more fibers 1502*a* at the first end 1514 and one or more fibers 1502*b* at the second end 1516 may be used to introduce light to and/or away from a waveguide device 1552 written in the substrate 1550. The fibers 1502*a* and 1502*b* may be attached at their respective fiber attachment portions 1506*a* and 1506*b*. The ends 1516 may be prepared using the techniques discussed above with regard to FIGS. 14A-C, with fiber alignment recesses formed at each end to receive the fibers 1502*a*, 1502*b*. Furthermore, the waveguide device 1552 may be written in the substrate 1550 using a 3-D femtosecond laser writing technique similar to that discussed above for with regard to FIGS. 14D and E for the waveguides 1412. Different types of waveguide devices 1552, both passive and active, may be written into the substrate 1550.

Figure 16:
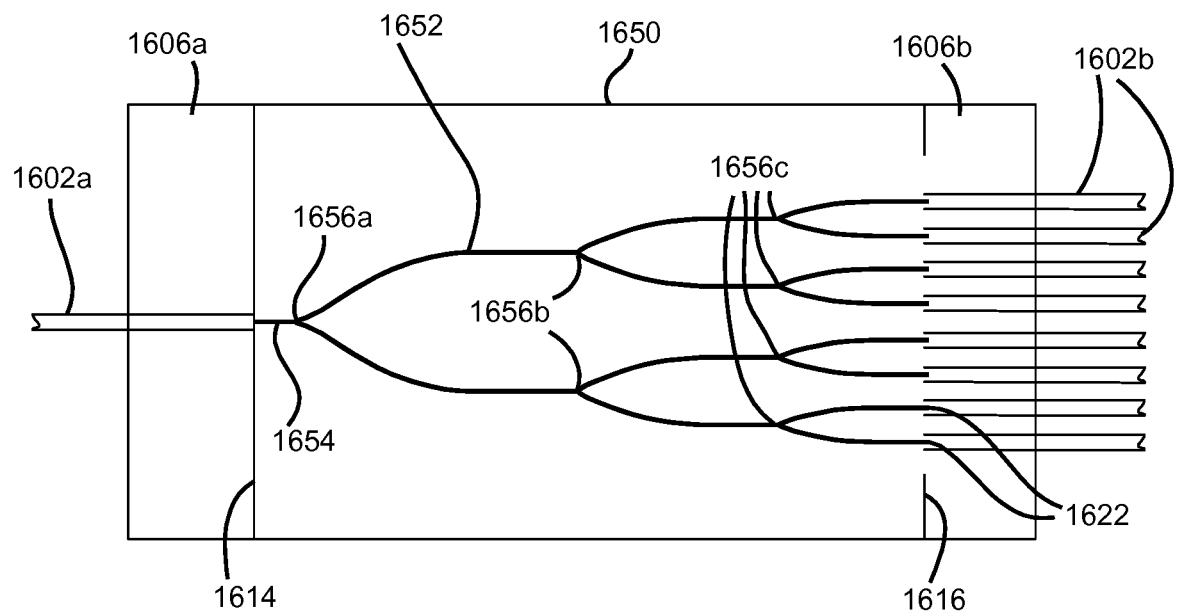
FIG. 16 schematically illustrates a waveguide splitter device on a fiber-coupled substrate according to an embodiment of the present invention.

Passive waveguide devices 1552 that may be formed in the substrate 1550 include splitters, filters and the like. For example, an example of a fiber-coupled splitter device 1650 is schematically illustrated in FIG. 16. In this embodiment, the splitter device 1650 includes a waveguide splitter network 1652 that includes a single waveguide 1654 coupled to a first fiber 1602*a* at the first end 1614, and three sets of 1:2 splitter nodes 1656*a*-1656*c*, resulting in eight waveguide outputs 1622 into eight output fibers 1602*b* at the second end 1616. In some embodiments the splitter nodes 1656*a*-1656*c* may be symmetrical splitter nodes, equally splitting light propagating from the left into two components of equal power propagating to the right. In other embodiments one or more of the splitter nodes may 1656*a*-1656*c* may be asymmetrical splitter nodes, so that light is not split equally between the two outputs from the splitter node 1656*a*-1656*c*.

In this and following illustrations some waveguides are illustrated with a single line on a substrate, for simplicity. It should be appreciated that this is not intended to indicate that the cross-section dimensions of the waveguides are constant along their lengths and that the waveguides may have expanded core dimensions close to the substrate edge for coupling to external optical fibers, in the manner described above.

Figure 17:
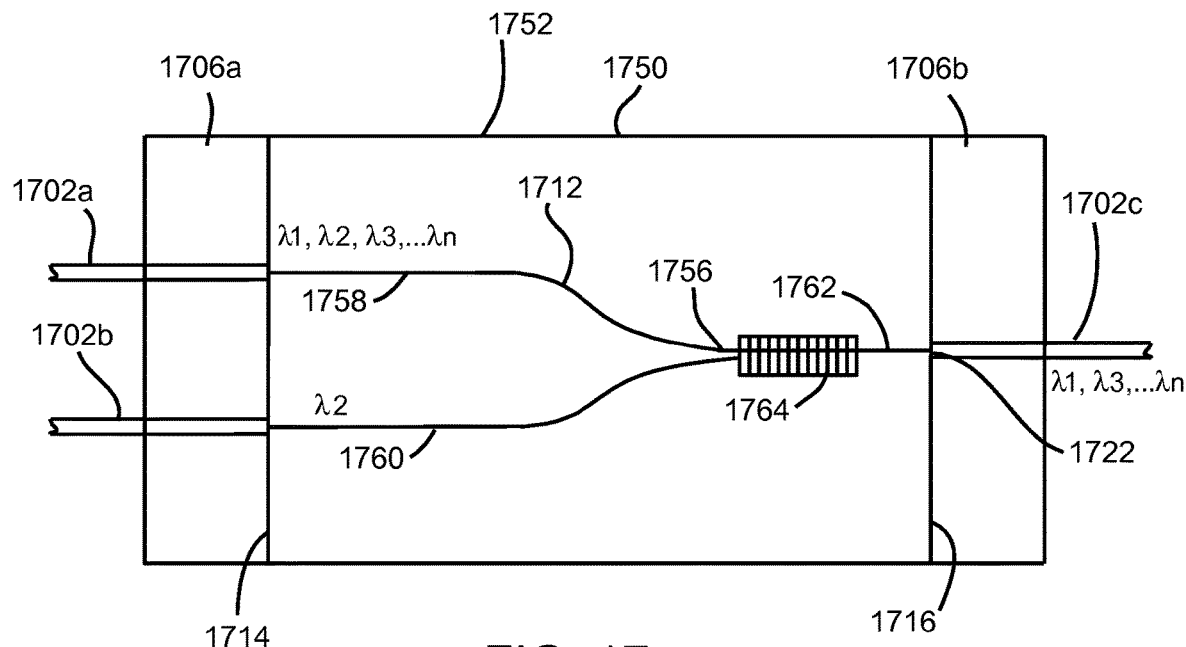
FIG. 17 schematically illustrates a waveguide add/drop filter device on a fiber-coupled substrate according to an embodiment of the present invention.

Another type of waveguide device that may be implemented in a fiber-coupled substrate 1750 according to an embodiment of the invention is an add/drop filter, an exemplary embodiment of which is schematically illustrated in FIG. 17. Fibers 1702a and 1702b are attached to the substrate 1750 at fiber attachment region 1706a, for example using the techniques discussed above. Also, fiber 1702c is attached to the substrate 1750 at fiber attachment region 1706b, for example using the techniques discussed above. The device 1752 includes a waveguide arrangement 1712 that has a first waveguide branch 1758 leading from fiber 1702a and a second waveguide branch 1760 leading from fiber 1702b. The two branches 1758 and 1760 meet at a waveguide grating 1764. The third branch 1762 is coupled to fiber 1702c. In this illustrated embodiment, the waveguide grating 1764 has the property of reflecting light at a wavelength $\lambda 2$. The add/drop filter operates in the following manner. If a combination of light wavelengths $\lambda 1, \lambda 2, \lambda 3 \ldots \lambda n$ enters the device 1752 at the first end 1714 via fiber 1702a, the light passes into the third branch 1762 and is incident at the waveguide grating 1764. At least a portion of the light at wavelength $\lambda 2$, and in some embodiments preferably most or all of the light at wavelength $\lambda 2$, is reflected at the waveguide grating 1764 and passes out of the device 1752 along fiber 1702b. The light that is not reflected by the grating 1764, i.e. at wavelengths $\lambda 1, \lambda 3 \ldots \lambda n$, is transmitted out of the device at waveguide output 1722 into fiber 1702c. Operated in reverse, if light at wavelengths $\lambda 1, \lambda 3 \ldots \lambda n$ is injected into the second end 1716 via fiber 1702c and at wavelength $\lambda 2$ is injected into the first end 1714 via fiber 1702b, light at a combination of wavelengths $\lambda 1, \lambda 2, \lambda 3 \ldots \lambda n$ will exit the device via fiber 1702a.

It will be appreciated that many variations of this device 1752 are possible, some of which may include the addition of more fibers to the substrate. For example, the device 1752 may include a waveguide optical circulator. Also, additional stages with gratings reflective at different wavelengths may be included so as to permit the adding and dropping of light at different wavelengths. Accordingly, the device may be provided with different numbers of fibers to permit the exit and entry of light at different wavelengths.

Other embodiments may include different optical waveguide elements to produce different optical functions.

Figure 18:
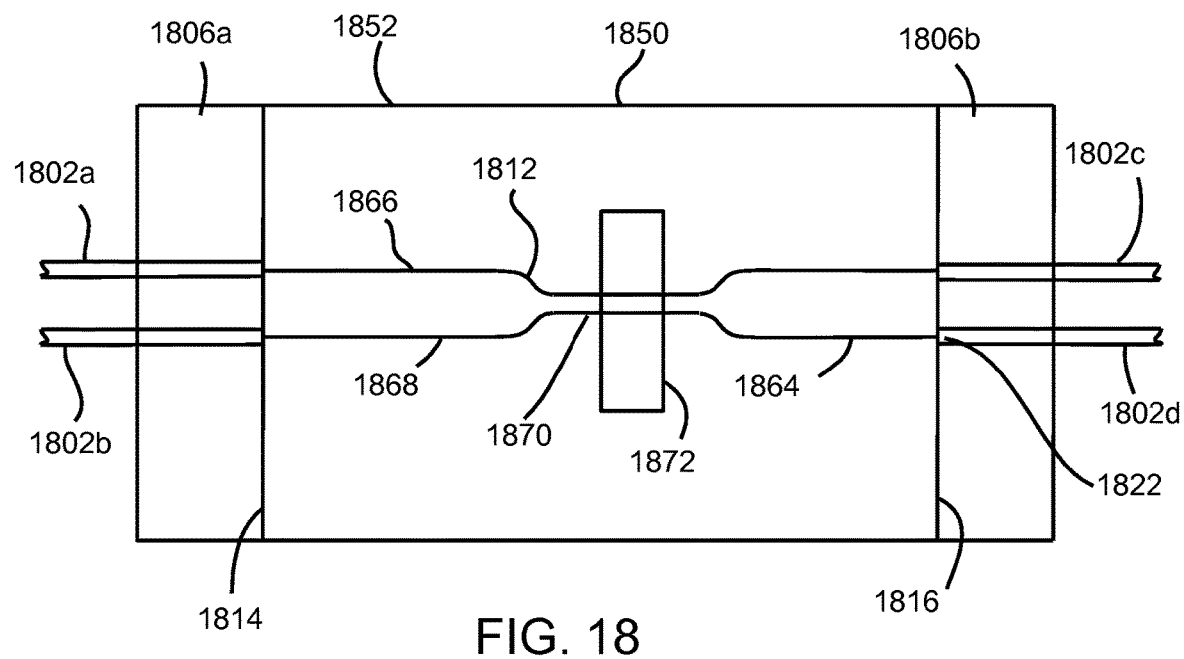
FIG. 18 schematically illustrates a switching device on a fiber-coupled substrate according to an embodiment of the present invention.

Another exemplary embodiment of a device 1852 that may be provided on a fiber-coupled substrate according to the present invention is schematically illustrated in FIG. 18. The device 1852 includes fibers 1802a and 1802b attached to the substrate 1850 at a fiber attachment section 1806a at the first end 1814 and fibers 1802c and 1802d attached at a fiber attachment section 1806b at the second end 1816. A waveguide structure 1812 includes a first waveguide 1866 leading between fibers 1802a and 1802c and a second waveguide 1868 leading between fibers 1802b and 1802d. At a waveguide coupling portion 1870 the two waveguides are closer together in the substrate than at the ends of the substrate 1814 and 1816. An externally controlled coupling mechanism 1872 is provided at the waveguide coupling portion to controllably permit the coupling of light between waveguides 1866 and 1868. Thus, when the externally controlled coupling mechanism 1872 is in one state, light propagating along waveguide 1866 from fiber 1802a propagates all the way to fiber 1802c undisturbed. When the coupling mechanism 1872 is in another state, light propagating along waveguide 1866 is coupled into second waveguide 1868 and exits the device via fiber 1802d.

The externally controlled coupling mechanism 1872 may be any suitable, actively controlled mechanism deployable on the substrate 1850. For example, the mechanism may be a microfluidic mechanism that controls the effective refractive index surrounding the waveguides in the coupling portion 1870. One approach to implementing microfluidic switching is described in U.S. Pat. No. 7,283,696, incorporated herein by reference. Other externally controllable coupling mechanisms may be used, for example using liquid crystals or nonlinear optical materials. In the case of a nonlinear optical crystal, the entire substrate and fiber attachment sections may be formed from a single nonlinear optical crystal, and waveguide devices written into the substrate, such as electro-optical switches, Mach-Zehnder interferometers and the like. Additionally, nonlinear optical material devices may be integrated into a glass or polymer substrate that includes the fiber attachment sections and waveguides.

Figure 19B:
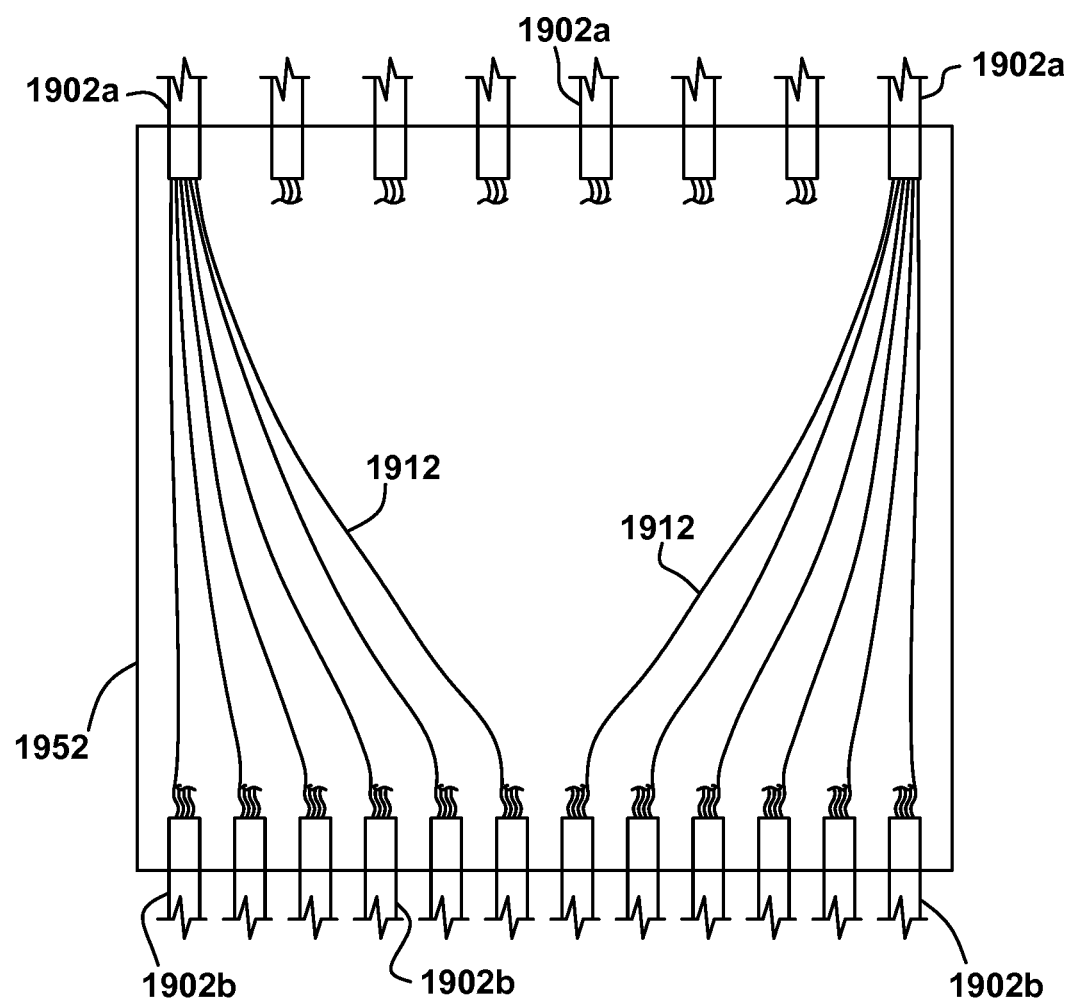

A device as described herein having fibers coupled at each end of the substrate may find use in optical communications and data transfer. For example, the fibers entering at the side of the device may be in the form of a fiber ribbon or flex-foil, as is schematically illustrated in FIGS. 19A-19B. The device 1952 is coupled to a first set of fibers 1902a at a first side and a second set of fibers 1902b at a second side. In the illustrated embodiment the device 1952 is a mixing pass-through device with waveguides 1912 coupling fibers 1902a to respective fibers 1902b in a different spatial order.

While various examples were provided above, the present invention is not limited to the specifics of the examples. For example, a fiber-coupled substrate may include many different types of waveguide devices, including both passive and active, and may require various numbers of fibers to be attached at either end of the substrate.

As noted above, the present invention is applicable to optical fiber communication and data transfer systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

LIST OF REFERENCE NUMERALS AND CORRESPONDING FEATURES 100 fiber optic connector
102 fibers
104 coupler
204 coupler
206 attachment section
208 waveguide section
210 alignment recess
212 output coupling face
214 attachment section cover
302 waveguide
304 waveguide coupler
306 fiber attachment section
308 waveguide section
310 fiber alignment recess
312 waveguide 312a larger waveguide cores
314 first end
316 second end
318 tapered region
404 coupler
410 fiber alignment features
414 first end
420 associated waveguide inputs
504 coupler
508 waveguide section
516 second end
522 expanded waveguide outputs
602 fiber
604 coupler
610 fiber alignment recess
612 one waveguide
616 second end
618 tapered region
620 waveguide input
622 waveguide output
624 fiber core
628 fiber core output
702 fiber
704 coupler
710 fiber alignment recess
712 one waveguide
718 grin section
720 waveguide input
722 waveguide output
723 angled face
724 fiber core
726 fiber core output
802a fibers
802b fibers
804 coupler
806 fiber alignment section
810a fiber alignment recesses
810b fiber alignment recesses
812a waveguides
812b waveguides
816 second end
820a inputs
820b inputs
822a waveguide inputs
822b waveguide outputs
1002b fibers
1102a fibers
1102b fibers
1104 couplers
1104a first couplers
1104b couplers
1112a waveguides
1112b tapered waveguide
1122a expanded waveguide outputs
1122b expanded ports
1202a fibers
1202b fibers
1204a coupler
1204b coupler
1228a cover
1228b cover
1230 locating pin recess
1230a attachment protrusions
1230b attachment protrusions
1232a attachment receiving slots
1232b attachment receiving slots
1406 fiber attachment section
1410 fiber alignment recesses
1412 entire waveguide
1418 expanded core section
1420 waveguide input
1422 waveguide output
1438 substrate
1440 laser
1442 portion
1444 laser focus
1446 ledge
1500 device
1502a fibers
1502b fibers
1506a fiber attachment portions
1506b fiber attachment portions
1514 first end
1516 ends
1550 substrate
1552 passive waveguide devices
1602a first fiber
1602b eight output fibers
1614 first end
1616 second end
1622 eight waveguide outputs
1650 fiber-coupled splitter device
1652 waveguide splitter network
1654 single waveguide
1656a splitter node
1702a fiber
1702b fiber
1702c fiber
1706a fiber attachment region
1706b fiber attachment region
1712 waveguide arrangement
1714 first end
1716 second end
1722 waveguide output
1750 fiber-coupled substrate
1752 device
1758 first waveguide branch
1760 second waveguide branch
1762 third branch
1764 grating
1802a fiber
1802b fibers
1802c fiber
1802d fiber
1806a fiber attachment section
1806b fiber attachment section
1812 waveguide structure
1814 first end
1816 second end
1850 substrate
1852 device
1866 first waveguide
1868 second waveguide
1870 coupling portion
1872 coupling mechanism
1902a coupling fibers
1902b fibers
1912 waveguides
1952 device

What is claimed is:
1. An optical fiber connector comprising:
    a first coupler having a waveguide section integrally formed with a fiber attachment section, the waveguide section having a first end proximate the fiber attachment section and a second end distal from the fiber attachment section, at least a first waveguide disposed in the waveguide section to lead light between the first end of the waveguide section and the second end of the waveguide section, the at least a first waveguide being unbranched and having a first core cross-section at the first end of the waveguide section and a second core cross-section at the second end of the waveguide section, the second core cross-section having an area larger than an area of the first core cross-section, the fiber attachment section having a first surface, at least one recess formed on the first surface for aligning an optical fiber with the first waveguide of the waveguide section;

at least a first optical fiber attached to the first coupler at the fiber attachment section, the at least a first optical fiber having a respective optical fiber core aligned to a respective at least a first waveguide; and a first cover over the first coupler, the first cover comprising an attachment mechanism for attaching the first cover to another coupler.

2. A connector as recited in claim 1, wherein the at least a first waveguide comprises a GRIN lens section.

3. A connector as recited in claim 1, wherein the at least a first waveguide comprises a first plurality of waveguides lying substantially in a first plane in the waveguide section and a second plurality of waveguide lying substantially in a second plane in the waveguide section displaced relative to the first plane.

4. A connector as recited in claim 3, wherein the at least one recess on the first surface comprises a first plurality of recesses adapted for aligning a first plurality of optical fibers with the first plurality of waveguides in the waveguide section, the input section has a second surface opposing the first surface, a second plurality of recesses being formed on the second surface for aligning a second plurality of optical fibers with the second plurality of waveguides in the waveguide section.

5. A connector as recited in claim 1, further comprising an anti-reflection coating on the second end of the waveguide section.

6. A connector as recited in claim 1, wherein the coupler is formed from glass.

7. A connector as recited in claim 1, wherein the at least one recess is at least one V-groove.

8. A connector as recited in claim 1, further comprising a second coupler having a waveguide section integrally formed with a fiber attachment section, at least a second optical fiber attached to the second coupler, and a second cover over the second coupler, the second cover comprising an attachment mechanism for attaching to the first cover.

9. A connector as recited in claim 1, further comprising at least a second waveguide disposed in the waveguide section, the second waveguide having a third core cross-section at the first end of the waveguide section and a fourth core cross-section at the second end of the waveguide section, the fourth core cross-section having an area larger than an area of the third core cross-section;

wherein the fiber attachment section comprises at least at least two recesses formed on the first surface for aligning optical fibers with the first and second waveguides of the waveguide section; and wherein at least a second optical fiber is attached to the first coupler at the fiber attachment section, the second optical fiber having a second optical core aligned to the second waveguide.

10. A connector as recited in claim 1, wherein the at least a first waveguide terminates at the second end of the waveguide section, the second end of the waveguide section being free of fiber alignment features.

11. A connector as recited in claim 1, wherein the first cover is disposed around at least four sides of the coupler.

* * * * *

UNITED STATES PATENT AND TRADEMARK OFFICE
CERTIFICATE OF CORRECTION

PATENT NO. : 10,739,519 B2
APPLICATION NO. : 15/745313
DATED : August 11, 2020
INVENTOR(S) : Watte et al.

Page 1 of 1

It is certified that error appears in the above-identified patent and that said Letters Patent is hereby corrected as shown below:

In the Claims

Column 14, Lines 23-24, Claim 9: "comprises at least at least two" should read --comprises at least two--

Signed and Sealed this
Twenty-eighth Day of June, 2022

Katherine Kelly Vidal
*Director of the United States Patent and Trademark Office*